United States Patent [19]
Goins

[11] Patent Number: 5,947,251
[45] Date of Patent: Sep. 7, 1999

[54] SHIM PLATE FOR REMANUFACTURED CLUTCH RELEASE BEARING AND HOUSING ASSEMBLY

[75] Inventor: Ronnie Gene Goins, Harrisburg, N.C.

[73] Assignee: Eaton Corporation, Cleveland, Ohio

[21] Appl. No.: 09/143,428

[22] Filed: Aug. 28, 1998

[51] Int. Cl.[6] .................................................. F16D 13/44
[52] U.S. Cl. .................................. 192/89.26; 192/110 B; 384/626
[58] Field of Search .................................. 192/98, 110 B, 192/89.26; 384/626, 537

[56] References Cited

U.S. PATENT DOCUMENTS

| | | | |
|---|---|---|---|
| 2,063,203 | 12/1936 | Stanley | 192/89.26 |
| 3,730,600 | 5/1973 | Degnan | 384/626 |
| 4,445,600 | 5/1984 | Schmidt | 192/98 |
| 4,632,235 | 12/1986 | Flotow et al. | |
| 4,660,702 | 4/1987 | Flotow. | |
| 4,733,979 | 3/1988 | Tsuruki | 384/626 |
| 4,760,906 | 8/1988 | Flotow et al. | 192/89.26 |
| 4,946,017 | 8/1990 | Flotow. | |
| 5,373,927 | 12/1994 | Gochenour et al. | 192/98 |

*Primary Examiner*—Charles A. Marmor
*Assistant Examiner*—Ha Ho
*Attorney, Agent, or Firm*—Dykema Gossett PLLC

[57] ABSTRACT

A shim for use in a clutch release bearing and housing assembly includes an annular base portion, a first pivot pad, a second pivot pad, a first contact leg and a second contact leg. The first pivot pad and the second pivot pad are both formed on a first side of the base portion. The second pivot pad is located opposite the first pivot pad. The first contact leg and the second contact leg both extend from the base portion substantially normal to the base portion. Both are circumferentially offset from both of the pivot pads.

11 Claims, 3 Drawing Sheets

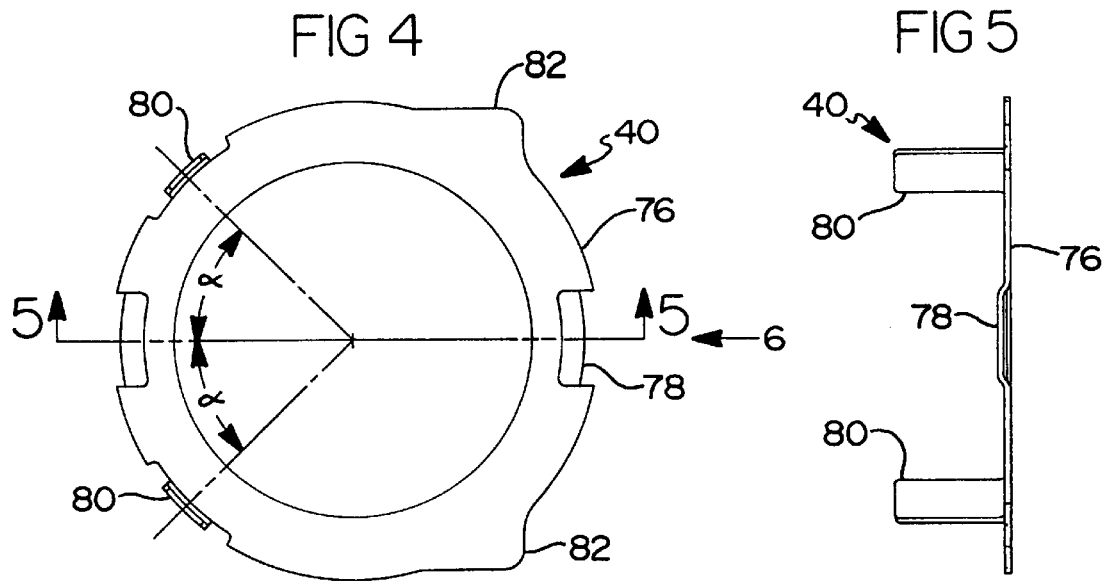
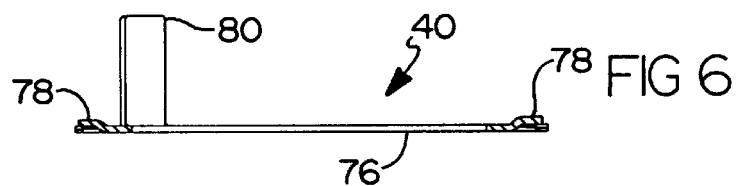
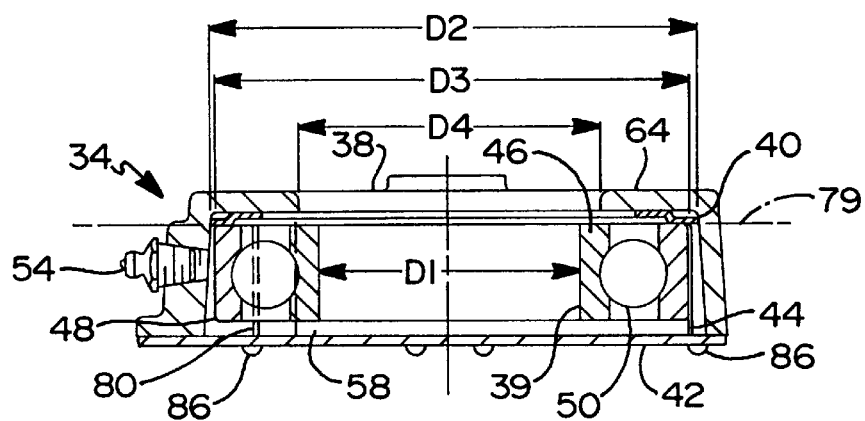

SHIM PLATE FOR REMANUFACTURED CLUTCH RELEASE BEARING AND HOUSING ASSEMBLY

FIELD OF THE INVENTION

The present invention relates to improvements in clutch systems and clutch release bearing and housing assemblies. More particularly, this invention relates to remanufactured clutch release bearing and housing assemblies.

BACKGROUND OF THE INVENTION

Motor vehicle friction clutches provide a selectively engagable frictional connection between an engine crank shaft and a motor vehicle transmission. A clutch driven disc with friction material is rotatably fixed to an input shaft of the transmission and is axially disposed between a flywheel fixed to the engine crank shaft and a clutch pressure plate. A cover is disposed over the pressure plate and is rigidly clamped to the flywheel. The pressure plate is connected to the cover by a flexible strap which enables axial movement of the pressure plate toward and away from the cover while preventing rotation of the pressure plate relative to the cover and flywheel.

The pressure plate is biased toward the flywheel and against the driven disc by one or more clutch springs. The clutch springs act against the pressure plate to hold the pressure plate against the flywheel. Known alternative embodiments of clutch springs include a diaphragm spring acting directly against the pressure plate, and, alternatively, a plurality of coil springs acting indirectly against the pressure plate through intervening mechanisms such as a retainer and a plurality of levers. Each embodiment has an associated means of selectively relieving the spring load. Diaphragm springs commonly have a plurality of radially inwardly extending fingers engaged by a clutch release and housing assembly. Coil springs have the retainer connected to the bearing and housing assembly for axial movement therewith. With either configuration, the spring load of the pressure plate against the driven disc is relieved by axially displacing the bearing and housing assembly axially along the transmission input shaft.

Bearing and housing assemblies for use in medium duty and heavy duty trucks include a plurality of features integrated into the bearing housing which allow the outer race of the bearing to be self aligning to a limited degree with respect to the inner race of the bearing, thereby evenly distributing the load within the bearing. Such alignment is important in prolonging bearing life. Alignment is achieved by enabling a limited amount of pivoting of the outer race about two axes. One pivot axis extends between two ears of the housing which are engaged by a clutch fork (not shown). The other pivot axis is defined by a pair of pivot pads disposed on a surface forming an end of the housing. The pivot pads are spaced approximately 180° apart from each other and are located for engagement by an end of the release bearing's outer race. A pair of axially extending radial engagement or contact teeth extending radially inwardly from an inner circumference of the housing. These teeth are located approximately 90° apart from each other and are equally spaced from the pivot pads. A flat wire spring, disposed between the housing and the outer race opposite the contact teeth, radially biases the outer race into engagement with the contact teeth. The contact teeth serve to limit radial contact between the outer race and the bearing housing. Limiting the radial contact facilitates pivoting of the outer race about the axis extending between the two pivot pads.

The above described bearing and housing assembly works well when the bearing and housing assembly is new. However, with use, the engagement teeth and the pivot pads begin to wear due to slippage of the outer race relative to the housing. When the engagement teeth wear to a point where the outer race also contacts the housing midway between the teeth, the outer race pivots less easily about the axis between the pivot pads. Further, when the pivot pads wear, the available amplitude of pivoting of the outer race is greatly reduced.

Typically, the contact teeth and the pivot pads are formed as-cast in the bearing housing. When the contact teeth and/or the pivot pads deteriorate to the point where pivoting as desired is no longer possible, the release bearing and housing assembly is often remanufactured (remanned). The housings are remanned by installing rivets to replace worn pads and teeth in the housing. A high level of dimensional control is not required, as the pivoting effect is present over a significant range of tooth and pad dimensions. However, the cost of drilling and riveting associated with the above described method of remanning is undesirably high and, in some cases, is not feasible. In the case of particularly severe wear, it is necessary to scrap the housing.

It is desired to provide an implement replacing worn features within a clutch bearing housing which is both easy to install and inexpensive.

It is also desired to provide an inexpensive method of remanufacturing bearing and housing assemblies.

It is also desired to provide a method of remanufacturing of bearing and housing assemblies enabling the remanufacture of bearing and housing assemblies using housings which would otherwise be scrapped.

SUMMARY OF THE INVENTION

According to one aspect of the invention, a shim for use in a clutch release bearing and housing assembly includes an annular base portion, a first pivot pad, a second pivot pad, a first contact leg and a second contact leg. The first pivot pad and the second pivot pad are both formed on a first side of the base portion. The second pivot pad is located opposite the first pivot pad. The first contact leg and the second contact leg both extend from the base portion substantially normal to the base portion. Both are circumferentially offset from both of the pivot pads.

According to another aspect of the invention, a clutch release bearing and housing assembly includes a roller bearing, a bearing housing, a shim, a cover and a spring. The roller bearing has an inner race and an outer race and a plurality of rollers radially disposed therebetween. The bearing housing has an axis of rotation and defines a cavity substantially cylindrical in shape and substantially concentric with the axis. The cavity is of a diameter greater than an outer diameter of the outer race. The bearing housing has a first end open to permit installation and removal of the roller bearing. The bearing housing also has a second end which is partially closed by an annular portion of the housing. The annular portion of the housing has an inside diameter less than the diameter of the cavity and greater than an inside diameter of the inner race. The bearing housing also has first and second engagement ears extending radially from the housing opposite one another. The shim is disposed inside the cavity against the second end. The shim has an annular base portion. First and second pivot pads are formed on a first side of the base portion. A first contact leg and a second contact leg both extend from the base portion substantially normal thereto and are circumferentially offset from both the pivot pads. The shim is oriented within the housing so that a line between the first and second pivot pads is at least approximately at right angles to a line between the engagement ears. The cover is disposed over the first end. The cover has an opening larger than the inner diameter of the race. The spring is disposed between the housing and the outer race. The spring is located to bias the outer race into radial contact with the first and second contact legs.

According to another aspect of the invention, a friction clutch for a motor vehicle assembly includes a pressure plate, a cover, a biasing spring, and a release bearing and housing assembly. The pressure plate is connected to the cover for rotatable movement therewith and axial movement relative thereto. The biasing spring is operably disposed between the cover and the pressure plate and biases the pressure plate in a first direction away from the cover. The release bearing and housing assembly is connected to the biasing spring wherein selective axial displacement of the release bearing and housing assembly deflects the spring and resultantly enables the pressure plate to move to a released position. The bearing and housing assembly further includes a roller bearing, a bearing housing, a shim, a cover and a spring. The roller bearing has an inner race and an outer race and a plurality of rollers radially disposed therebetween. The bearing housing has an axis of rotation and defines a cavity substantially cylindrical in shape and substantially concentric with the axis. The cavity is of a diameter greater than an outer diameter of the outer race. The bearing housing has a first end open to permit installation and removal of the roller bearing. The bearing housing also has a second end which is partially closed by an annular portion of the housing. The annular portion of the housing has an inside diameter less than the diameter of the cavity and greater than an inside diameter of the inner race. The bearing housing also has first and second engagement ears extending radially from the housing opposite one another. The shim is disposed inside the cavity against the second end. The shim has an annular base portion. First and second pivot pads are formed on a first side of the base portion. A first contact leg and a second contact leg both extend from the base portion substantially normal thereto and are circumferentially offset from both the pivot pads. The shim is oriented within the housing so that a line between the first and second pivot pads is at least approximately at right angles to a line between the engagement ears. The cover is disposed over the first end. The cover has an opening larger than the inner diameter of the race. The spring is disposed between the housing and the outer race. The spring is located to bias the outer race into radial contact with the first and second contact legs.

According to another aspect of the invention, a method for remanufacturing a clutch release bearing includes the steps of disassembling a used clutch release bearing, forming a shim, orienting the shim, replacing the roller bearing, placing a spring in the assembly, and fixing an end cover of the assembly. The shim is formed so as to have an annular base portion with first and second pivot pads formed on a first side of the base portion opposite each other. First and second contact legs extend from the base portion substantially normal to the base portion and offset from the pivot pads. The shim is oriented within the bearing housing so that a line connecting the pivot pads is substantially parallel to a predetermined line within the bearing housing. The replacement roller bearing is placed over the shim. The spring is placed between the housing and an outer race of the bearing at a location selected to bias the bearing outer race against the contact legs. The end cover is fixed over an open end of the housing and thereby retains the bearing and the shim and the spring within the bearing housing.

The disclosed invention provides an implement which replaces worn features within a bearing housing and is both easy to install and inexpensive.

The present invention also provides a method of remanufacturing bearing and housing assemblies which is inexpensive.

The present invention also provides a method of remanufacturing bearing and housing assemblies enabling the remanufacture of bearing and housing assemblies which would otherwise be scrapped.

BRIEF DESCRIPTION OF THE DRAWINGS

FIG. 3 is a sectional side view of a clutch release bearing and housing assembly.

FIG. 4 is an end view of a shim.

FIG. 5 is a sectional view of the shim of FIG. 4 in the direction of arrow 5.

FIG. 6 is a side view of the shim of FIG. 4 in the direction of arrow 6.

DETAIL DESCRIPTION OF A PREFERRED EMBODIMENT

Figure 1:
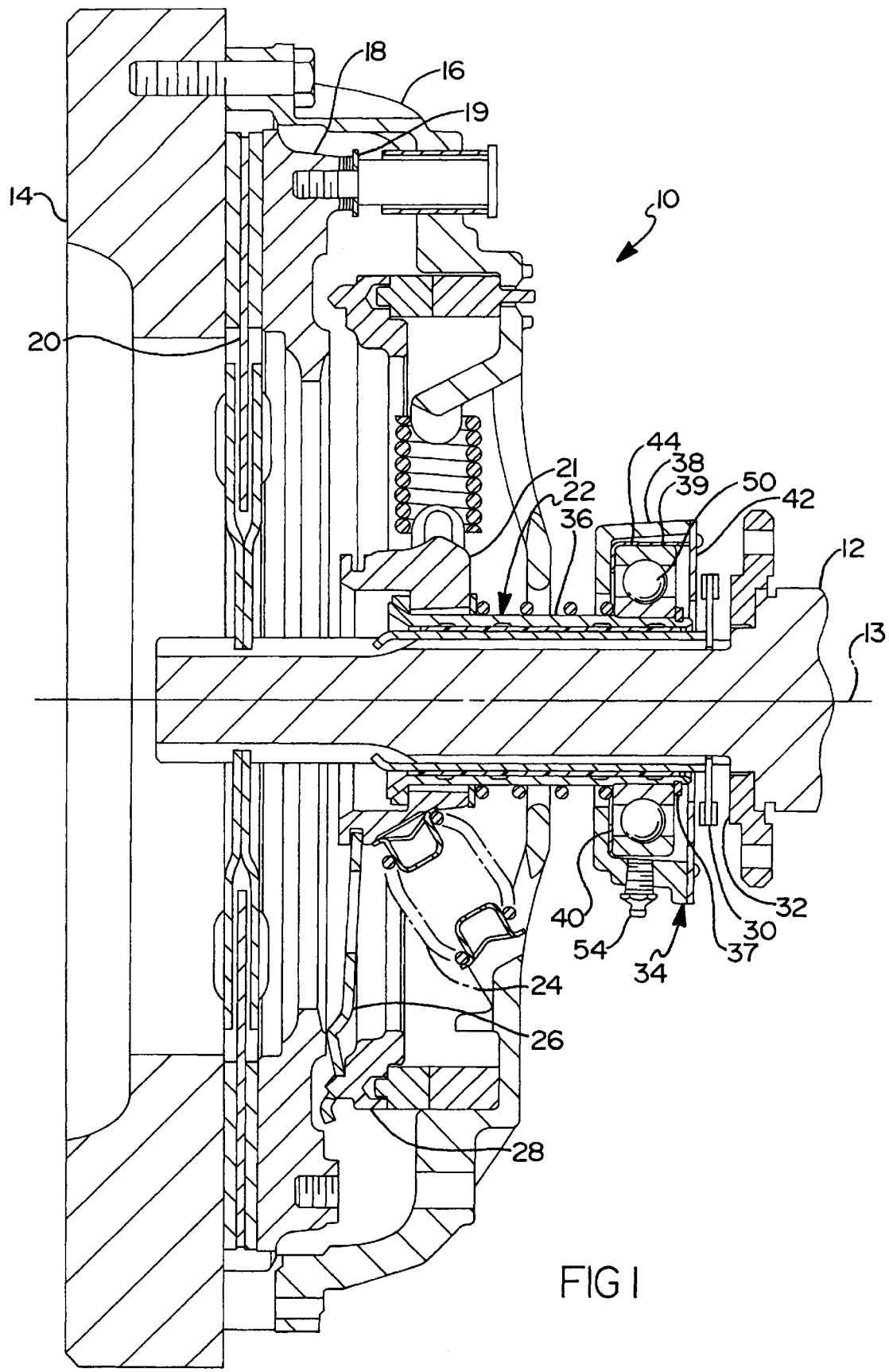
FIG. 1 is a sectional side view of a clutch assembly.

An exemplary motor vehicle clutch assembly 10 is shown in FIG. 1. Clutch assembly 10 is, when installed in a vehicle, disposed between a transmission input shaft 12 and an engine crank shaft (not shown). Clutch assembly 10 has an axis of rotation 13. A flywheel 14 is configured to be rigidly fixed to the engine crank shaft. A cover 16 is rigidly mounted to flywheel 14 by a plurality of screws. A pressure plate 18 is rotatably fixed to cover 16 by at least one flexible strap 19 which allows pressure plate 18 to move axially relative to cover 16. A driven disc is axially disposed between pressure plate 18 and flywheel 14.

A retainer 21 of a retainer and release bearing assembly 22 is engaged by a plurality of apply springs 24 and levers 26. Levers 26 pivotably contact an adjusting mechanism 28 and engage pressure plate 18. Apply springs 24 bias levers 26 against pressure plate 18.

A clutch brake 30 is disposed between a non-rotating braking surface 32 and a clutch release bearing and housing assembly 34. Clutch brake 30 is rotatably coupled to input shaft 12. When bearing and housing assembly 34 is moved sufficiently close to braking surface 32 so as to engage clutch brake 30, the speed of input shaft 12 is gradually halted due to the compressive frictional contact between brake 30 and both braking surface 32 and bearing and housing assembly 34.

Bearing and housing assembly 34 is connected to retainer 21 by a retainer sleeve 36. A snap ring 37 keeps bearing and housing assembly 34 on sleeve 36.

Figure 2:
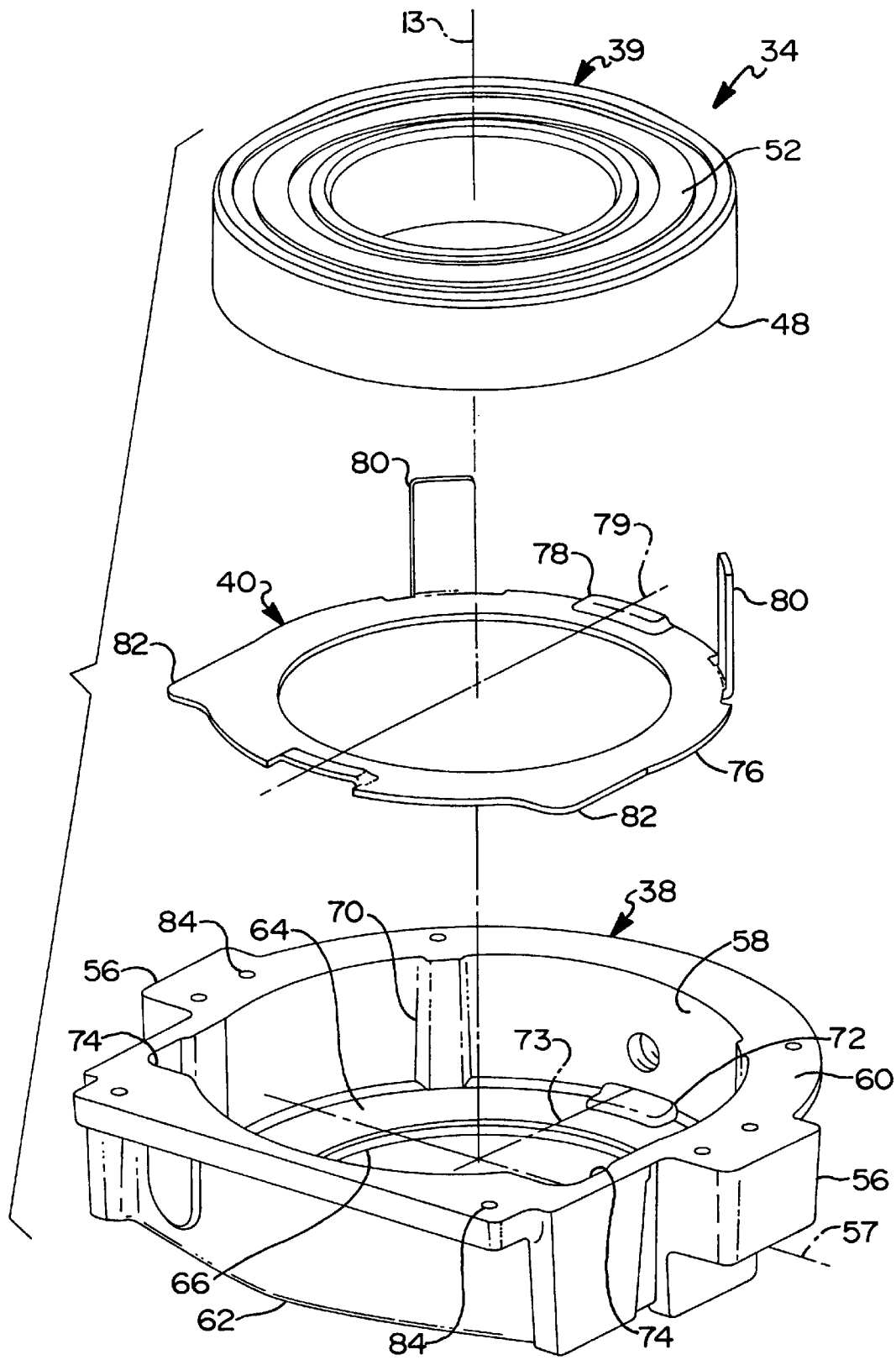
FIG. 2 is an exploded perspective view of some of the elements of a clutch release bearing and housing assembly.

Bearing and housing assembly 34, best shown in FIG. 2 and FIG. 3, includes both a bearing housing 38 and a roller bearing 39 disposed therein. A shim 40 is axially disposed between roller bearing 39 and housing 38. A cover 42 closes an end of bearing housing 38 to trap bearing 39 therein. A flat wire spring 44 is radially disposed between housing 38 and bearing 39, biasing bearing 39 against axially extending portions of shim 40.

Roller bearing 39 as shown in FIG. 3 includes an inner race 46, an outer race 48, rollers 50 and a cage 52 which helps retain rollers 50. An inner diameter D1 of inner race 46 is sized to receive retainer sleeve 36. A grease fitting 54 is threaded into a side of bearing housing 38 through an aperture therein. Housing 38 also has a pair of engagement ears 56, best shown in FIG. 2, upon which may be mounted replaceable wear elements (not shown) for engagement with a clutch fork (not shown). Contact between the wear elements on the engagement ears 56 and the clutch fork defines a first pivot axis 57 extending across ears 56.

Bearing housing 38 has a cavity 58 therein which is substantially cylindrical in shape. Cavity 58 receives bearing 39. Cavity 58 has a diameter of D2 which is greater than an outside diameter D3 of outer race 48. Bearing housing 38 has a first end 60 which is open, enabling roller bearing 39 to be installed in and removed from bearing housing 38. A second end 62 of bearing housing 38 is partially closed by an annular portion 64. Annular portion 64 has an opening 66 of diameter D4 which is slightly larger than the inside diameter D1 of inner race 46. Annular portion 64 is therefore able to retain roller bearing 39 while allowing sleeve 36 to pass therethrough.

Bearing housing 38 has, as best shown in FIG. 2, a pair of axially extending radial engagement or contact teeth 70 inside cavity 58. A pair of pivot pads 72, only one of which can be seen in FIG. 2, are disposed 180° opposite each other across opening 66. Anti-rotation recesses 74 extend into housing 38. Engagement teeth 70 are separated by 90° and are each disposed at approximately 45° to a second pivot axis 73 extending between pivot pads 72. Outer race 48 is pressed against teeth 70 by spring 44. The minimal contact between the outer diameter of outer race 48 and teeth 70 enables outer race 48 to pivot on pads 72 about axis 73, and thereby maintain alignment with inner race 46. Pivot pads 72 and engagement teeth 70 are shown in an unworn condition in FIG. 2. However, due to some slippage which occurs between outer race 48 and bearing housing during the service life of bearing and housing assembly 34, teeth 70 and pads 72 will wear. The wear reduces the ability of outer race 48 to pivot within housing 38.

Shim 40 is installed in remanufacturing bearing and housing assemblies 34, and includes features which compensate for the wear of teeth 70 and pads 72. Shim 40 has an annular base portion 76 into which are formed, at an outer periphery, a pair of supplemental pivot pads or pivot bumps 78 which extend outward on a first side of annular base portion 76. Annular base portion has its outer perimeter sized to fit within cavity 58 and has an inside diameter less than D3 and greater than D4. A pivot axis 79 extends across pivot bumps 78. A pair of contact legs 80 extend axially outward from base portion 76 in the same direction as pivot bumps 78. Contact legs 80 are each spaced an angle $\alpha$ equal to 45° from axis 79. Anti-rotation lobes 82 are provided on the outer periphery of annular base portion 76. As indicated in FIG. 2, anti-rotation lobes 82 are received by recesses 74. These features 74 and 82 orient shim 40 within housing 38 and prevent rotation of shim 40 within housing 38. Contact legs 80 are in alignment with the remains of engagement teeth 70 of housing 38, and pivot bumps 78 are disposed over the remains of pivot pads 72. Pivot bumps 78 and contact legs 80 advantageously serve as substitutes for the worn teeth 70 and pads 72 without necessitating any drilling or riveting of housing 34. Housing 38, as shown in FIG. 2, includes a plurality of rivet apertures 84 for receiving rivets which retain cover 42 and the engagement ear wear pads.

Using the inventive shim 40, clutch release bearing and housing assembly 34 can be remanufactured in the following way. First, the bearing and housing assembly 34 is removed from retainer sleeve 36. Rivets 86 which retain cover 42 are removed. Cover 42 is removed from housing 38. Flat wire spring 44 is removed. Worn roller bearing 39 is removed. Housing 38 and cover 42 are cleaned as required. Shim 40 is oriented within housing 38 by aligning anti-rotation lobes 82 and recesses 74. A replacement roller bearing 39 is disposed in housing 38 over shim 40. A replacement flat wire spring 44 is installed between outer race 40 and housing 38 at a location approximately opposite contact legs 80 so that spring 44 biases outer race 48 into legs 80. Cover 42 is aligned with and placed over first end 60 of housing 38 and riveted thereto. Rebuilt assembly 34 is installed in a clutch assembly 10 and is ultimately installed in a vehicle.

Many modifications and variations of the present invention are possible in light of the above teaching. For instance, the precise locations of the contact legs 80 may be slightly altered without affecting their function. Also, the location and shape of the anti-rotation lobes could be changed. Also, the specific configuration of the clutch may be different. A diaphragm spring may, for example, be used in place of the apply springs and levers shown in FIG. 1. It is therefore to be understood, that within the scope of the appended claims, the invention may be practiced other than as specifically described above.

I claim:

1. A shim for use in a clutch release bearing and housing assembly comprising:

an annular base portion;

a first pivot pad formed on a first side of the base portion;

a second pivot pad formed on the first side of the base portion and located opposite from the first pivot pad;

a first contact leg extending from the base portion substantially normal to the base portion circumferentially offset from both of the pivot pads; and a second contact leg extending from the base portion substantially parallel to the first contact leg and circumferentially offset therefrom.

2. A shim as claimed in claim 1 wherein the contact legs are equally spaced from a line connecting the pivot pads.

3. A shim as claimed in claim 2 wherein the contact legs are separated by an angle of approximately 90°.

4. A clutch release bearing and housing assembly comprising:

a roller bearing having an inner race and an outer race and a plurality of rollers radially disposed therebetween;

a bearing housing having an axis of rotation and defining a cavity substantially cylindrical in shape and substantially concentric with the axis and the cavity being of a diameter greater than an outside diameter of the outer race and having a first end which is open to permit installation and removal of the roller bearing and having a second end which is partially closed by an annular portion of the housing with the annular portion having an inside diameter less than the diameter of the cavity and greater than an inside diameter of the inner race and having a first engagement ear extending radially from the housing and a second engagement ear extending radially from the housing opposite the first engagement ear;

a shim disposed inside the cavity against the second end and having an annular base portion, a first pivot pad formed on a first side of the base portion, a second pivot pad formed on the first side of the base portion opposite the first pivot pad, a first contact leg extending from the base portion substantially normal to the base portion circumferentially offset from both the pivot pads;

a second contact leg extending from the base portion circumferentially offset from both pivot pads and substantially parallel to the first contact leg wherein the shim is oriented within the housing so that a line between the first and second pivot pads is at least proximately at right angles to a line between the ears;

a cover disposed over the first end and the cover having an opening larger than the inner diameter of the inner race; and a spring disposed between the housing and the outer race and the spring being located to bias the outer race into radial contact with the legs.

5. A clutch release bearing and housing assembly as claimed in claim 4 wherein the first and second pivot pads engage the outer race, thereby enabling the outer race to pivot.

6. A clutch release bearing and housing assembly as claimed in claim 4 wherein the contact legs are equally spaced from the line between the pivot pads.

7. A clutch release bearing and housing assembly as claimed in claim 6 wherein the bearing housing has integrally formed pivot pads over which the pivot pads of the shim are placed.

8. A clutch release bearing and housing assembly as claimed in claim 6 wherein the contact legs are separated by an angle of approximately 90°.

9. A clutch release bearing and housing assembly as claimed in claim 8 wherein the bearing housing has integrally formed contact teeth over which the contact legs are placed.

10. A friction clutch assembly for a motor vehicle comprising:

a pressure plate;

a cover to which the pressure plate is connected for rotatable movement therewith and axial movement relative thereto;

a biasing spring operably disposed between the cover and the pressure plate and biasing the pressure plate in a first direction away from the cover;

a release bearing and housing assembly connected to the biasing spring wherein selective axial displacement of the release bearing and housing assembly deflects the spring and resultantly enables the pressure plate to move to a released position, further wherein the bearing and housing assembly includes:

a roller bearing having an inner race and an outer race and a plurality of rollers radially disposed therebetween;

a bearing housing having an axis of rotation and defining a cavity substantially cylindrical in shape and substantially concentric with the axis and the cavity being of a diameter greater than an outside diameter of the outer race and having a first end which is open to permit installation and removal of the roller bearing and having a second end which is partially closed by an annular portion of the housing with the annular portion having an inside diameter less than the diameter of the cavity and greater than an inside diameter of the inner race and having a first engagement ear extending radially from the housing and a second engagement ear extending radially from the housing opposite the first engagement ear;

a shim disposed inside the cavity against the second end and having an annular base portion, a first pivot pad formed on a first side of the base portion, a second pivot pad formed on the first side of the base portion opposite the first pivot pad, a first contact leg extending from the base portion substantially normal to the base portion circumferentially offset from both the pivot pad, a second contact leg extending from the base portion circumferentially offset from both pivot pads and substantially parallel to the first contact let wherein the shim is oriented within the housing so that a line between the first and second pivot pads is at least approximately at right angles to a line between the ears;

a cover disposed over the first end and the cover having an opening larger than the inner diameter of the inner race; and a spring disposed between the housing and the outer race and the spring being located to bias the outer race into radial contact with the legs.

11. A method for remanufacturing a clutch release bearing comprising the steps of:

disassembling a used clutch release bearing;

forming a shim having:
 an annular base portion;
 a first pivot pad on a first side of the base portion;
 a second pivot pad on the first side of the base portion opposite the first pivot pad;
 a first contact leg extending from the base portion substantially normal to the base portion circumferentially offset from the pivot pads; and
 a second contact leg extending from the base portion substantially parallel to the first contact leg and circumferentially offset therefrom;

orienting the shim within a bearing housing of the assembled bearing to that a line connecting the pivot pads is substantially parallel to a predetermined line within the bearing housing;

placing a replacement roller bearing within the housing over the shim;

placing a spring between the housing and an outer race of the bearing at a location selected to bias the bearing outer race against the contact legs;

fixing an end cover over an open end of the housing thereby retaining the bearing and the shim and the spring within the bearing housing.

\* \* \* \* \*

UNITED STATES PATENT AND TRADEMARK OFFICE
CERTIFICATE OF CORRECTION

PATENT NO. : 5,947,251
DATED : September 7, 1999
INVENTOR(S) : Goins

It is certified that error appears in the above-identified patent and that said Letters Patent is hereby corrected as shown below:

Column 8, line 19, please delete "let" and insert --leg--

Signed and Sealed this

Eighth Day of February, 2000

Attest:

Q. TODD DICKINSON

Attesting Officer

Commissioner of Patents and Trademarks